June 14, 1960 W. A. REINHART 2,940,252
GAS STREAM THRUST REACTION PROPULSION ENGINES WITH
NOISE-SUPPRESSION AND THRUST-REVERSING
NOZZLE MEANS
Filed Feb. 7, 1956 4 Sheets-Sheet 2

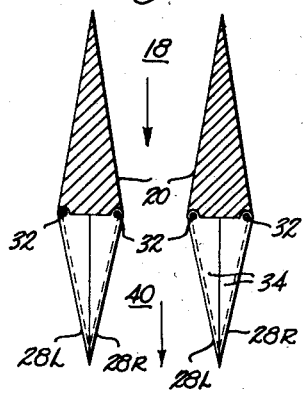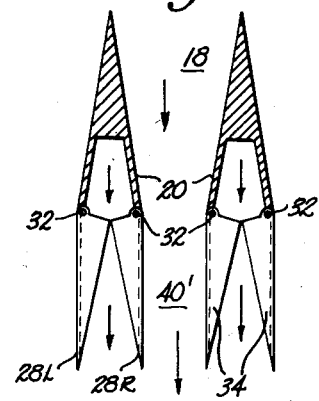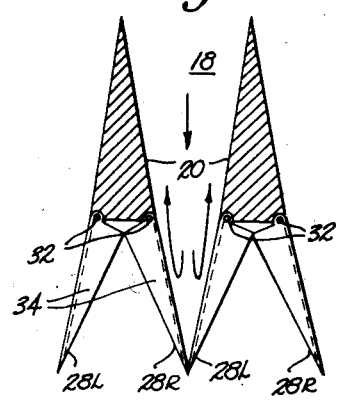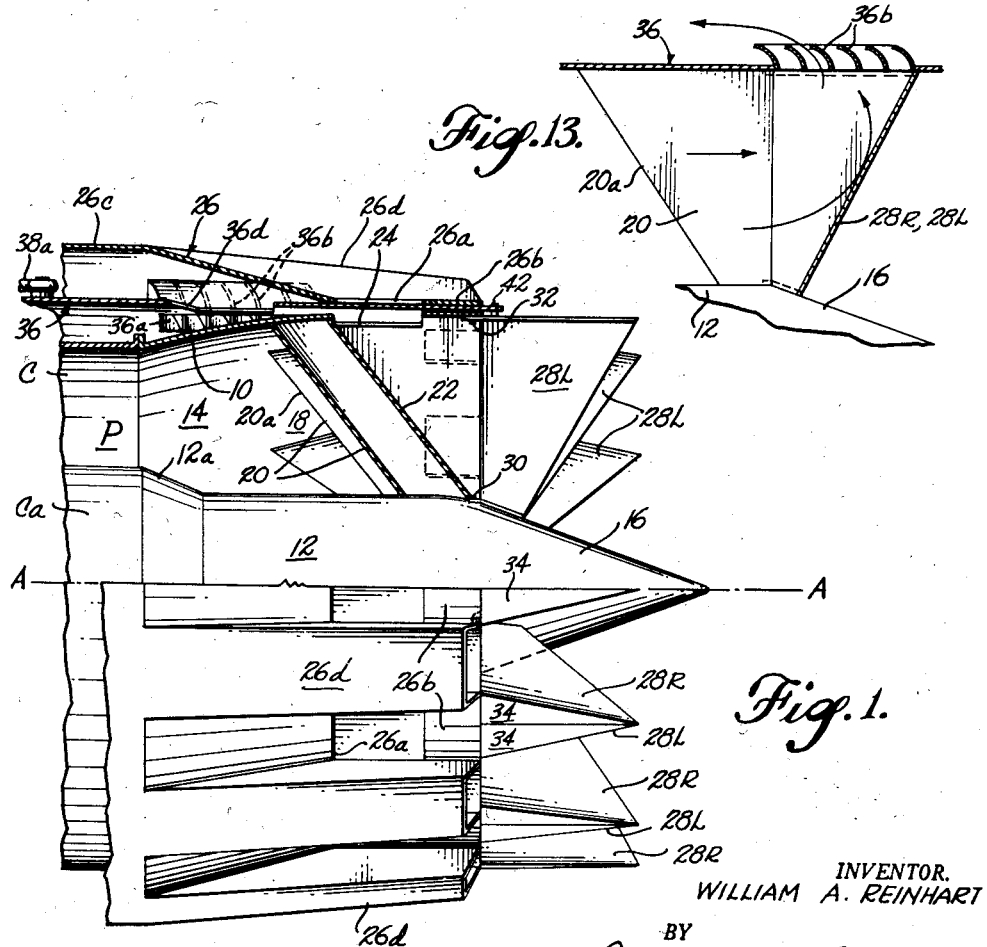

INVENTOR.
WILLIAM A. REINHART
BY
ATTORNEYS

June 14, 1960

W. A. REINHART 2,940,252

GAS STREAM THRUST REACTION PROPULSION ENGINES WITH
NOISE-SUPPRESSION AND THRUST-REVERSING
NOZZLE MEANS

Filed Feb. 7, 1956

INVENTOR.
WILLIAM A. REINHART

BY Reynolds, Beach & Christensen

ATTORNEYS

INVENTOR.
WILLIAM A. REINHART

United States Patent Office

2,940,252
Patented June 14, 1960

2,940,252

GAS STREAM THRUST REACTION PROPULSION ENGINES WITH NOISE-SUPPRESSION AND THRUST-REVERSING NOZZLE MEANS

William A. Reinhart, Bellevue, Wash., assignor to Boeing Airplane Company, Seattle, Wash., a corporation of Delaware Filed Feb. 7, 1956, Ser. No. 563,954

19 Claims. (Cl. 60—35.54)

This invention relates to improvements in gas stream thrust reaction engines, and more specifically concerns improvements in the discharge nozzles of such engines, particularly jet engines, whereby the wake noise thereof may be suppressed and whereby thrust reversal may be achieved at will. The invention is herein illustratively described by reference to the presently preferred form thereof; however, it will be recognized that certain modifications and changes therein may be made without departing from the essential or characterizing features involved. Certain aspects of the improved nozzle means herein disclosed represent subject matter contained in the copending applications of George S. Schairer, Serial No. 562,050, filed January 30, 1956 and William A. Reinhart, Serial No. 563,952, filed February 7, 1956. Reference is also made to the copending application of Holden W. Withington, Serial No. 562,051, filed January 30, 1956, now abandoned, concerning subject matter related to that herein disclosed.

In the application of jet engines to airplanes, for example, particularly passenger and transport airplanes, it is desirable to provide means for suppressing the thunderous wake noise that attends operation of conventional jet engines. As explained in the above-cited copending Schairer patent application, jet engines noise in the low frequency range gives the greatest difficulty since it propagates through the atmosphere with relatively small attenuation, and since its presence creates certain problems of designing the airplane structure against vibrational stresses and of insulating the airplane cabin walls against sound transmission. The above-cited application by the present inventor constitutes an improvement over the above-cited Schairer application concerning a means for reducing total engine noise and shifting the frequency of the predominant noise into the inaudible or high-frequency audible range where it is less bothersome.

Briefly, this shift of predominant-noise frequency, as explained in the above-cited applications, is accomplished by dividing the jet stream into a plurality of divisional or branch streams which are primarily generators only of high-frequency sound and which are sufficiently separated physically that material recombining thereof does not take place until the gases have passed beyond the apices of the constant-velocity core regions of the individual streams. Thus any low-frequency noise which does attend recombining of the divisional streams will occur at relatively low intensity. Moreover, by forming the nozzle to produce a plurality, greater than four, of radial branch streams total material noise reduction is achieved by the baffle or interference effect which takes place as between streams throughout a large solid angle of sound radiation from each such stream. As another desirable feature of such noise suppression nozzles provision is made for efficient entrainment of secondary air into and along the spaces between divisional streams as they emerge from the nozzles, thereby facilitating rapid mixing of the gases with secondary air close to the nozzle where the sounds produced occur at relatively high frequencies, and insuring maintenance of stream separation for material distances downstream from the nozzle as desired. In accordance with the above-cited application of the present inventor, improved nozzle efficiency and divisional stream separation is achieved by locating the inner edges of the radial branch streams on a locus, preferably circular, of materially large diameter and by the provision of a tail cone having its base extending around such locus. The present invention in its preferred form as herein disclosed represents improvements in nozzles utilizing these principles.

An object of the present invention is to provide an improved high-thrust noise suppression nozzle which operates in accordance with the teachings of the above-cited application by the present inventor, but which incorporates means for actuating the noise suppression elements out of their normal or maximum noise suppression position into a maximum thrust-conducive position when necessary, as in situations wherein some sacrifice in noise reduction can be tolerated, or wherein it may be essential, in order to achieve maximum thrust.

It should be recognized that, in the main, nozzle thrust is not so materially reduced by the use of the disclosed noise suppression means as to create a thrust deficiency in most situations. However, there are specific situations wherein even a slight thrust reduction is to be avoided, and the present invention is concerned with the provision of an efficient noise suppression nozzle which can be adjusted at will to restore maximum thrust to the engine when needed. Occasions when full thrust may be essential include take-off with very heavy load from a relatively short runway and cruising at high altitude when maximum speed is desirable. Even in these situations with the nozzle in its maximum thrust setting the engine noise is not as intense as with conventional nozzles whereas the efficiency is substantially as high.

The reason a certain amount of noise can be tolerated in favor of achieving maximum thrust when cruising fast at high altitudes is two-fold. In the first place, net thrust of a jet engine equals gross thrust less the amount of thrust required to accelerate dead air to the speed of the airplane. Since this latter quantity may become substantially equal to net thrust at high speeds, and since any thrust loss occurring as a result of nozzle modification for suppressing noise is subtracted from gross thrust alone, a small loss of thrust under static or ground conditions is virtually doubled at high speed. Hence maximum attainable speed is heavily dependent on avoidance of thrust loss. Secondly, engine noise, as a nuisance to bystanders on the ground, is not a serious problem with the airplane at high altitude.

In accordance with a further object of the invention, with the nozzle in its maximum noise suppression setting provision is made for efficient entrainment of secondary air into the spaces between divisional or branch discharge streams. One effect of adjusting the nozzle from its maximum sound suppression setting to its maximum-thrust setting is the exclusion of secondary air in the discharge of the engine and thus the elimination of thrust loss due to that factor.

Another object is such a nozzle means having effective and reliable provisions for achieving thrust reversal of the engine. More particularly it is an object to combine effectively in a noise suppression nozzle, and more specifically in one achieving the foregoing objectives, a compact, reliable and relatively simple means for selectively reversing engine thrust, and in an arrangement wherein engine noise in the reverse-thrust setting of the nozzle is also at a minimum.

A related object is to achieve the foregoing by a mechanical arrangement utilizing parts in common for the different control adjustments of the nozzle, thereby minimizing engine weight and simplifying construction thereof.

Still another object is an improved device for reversing thrust of a gas stream thrust reaction engine.

Another object is a thrust-reversing means for gas stream thrust-reaction engines which may be adjusted between forward and reverse-thrust settings thereof by relatively short movements of the stream-intercepting deflector elements thereof.

In fulfilling the above and related objects the invention comprises nozzle means having a plurality of radially extending stream dividers therein separating the jet stream into a plurality of radially disposed rearwardly flowing branch streams and a plurality of rearwardly and radially extending pairs of vanes mounted to pivot individually about their forward edges on radial axes disposed respectively along the opposite sides of the individual stream dividers near the aft ends thereof. Said stream dividers serve also as air ducts conducting secondary air from the nozzle sides rearwardly into the spaces formed between the members of the vanes of the pairs whereby in the mutually parallel positions of the vanes of the pairs secondary air is entrained efficiently into the regions between gas branch streams flowing on opposite sides of the respectively adjoining stream dividers. Means for actuating said vanes of each pair pivotally toward one another into rearwardly convergent relationship improves nozzle thrust for situations requiring maximum thrust with less importance attached to noise suppression.

As a further feature of the invention the vanes of each pair are formed with outward divergence between their fore and aft edges, whereby separation of the vanes into rear-edge contact with the adjacent vanes of adjacent pairs on either side of each stream divider forms not only an obstruction to rearward flow of gases but a deflector turning the gas streams radially outward of the nozzle. Further stream deflector means preferably in the form of parallel series of curved plates mounted in circumferential registry with the flow spaces between stream dividers are positioned in the paths of the outwardly deflected streams in the latter position of the vanes and deflect such streams forwardly of the engine to produce reverse thrust. As a further and more specific feature, the series of stream deflecting curved plates are mounted on an axially movable sleeve surrounding the nozzle proper, with actuating connections from the sleeve to the vanes whereby axial movement of the sleeve effects pivotal movement of the vanes progressively, or in steps, such that final movement of the sets of curved plates into stream deflecting position is accompanied by and preferably precedes actuation of the vanes into stream-deflecting position. Lesser displacement of the sets of curved plates positions the vanes of each pair in parallel or maximum noise-suppression relationship. Return of the sets of curved plates to fully retracted position effects movement of the vane pairs into their rearwardly convergent or maximum-thrust settings, wherein secondary air entrainment is cut off to insure maximum nozzle efficiency.

These and other features, objects and advantages of the invention will become more fully evident from the following description thereof by reference to the accompanying drawings.

Figure 1 is a side view partly in section of the improved nozzle means.

Figure 4:
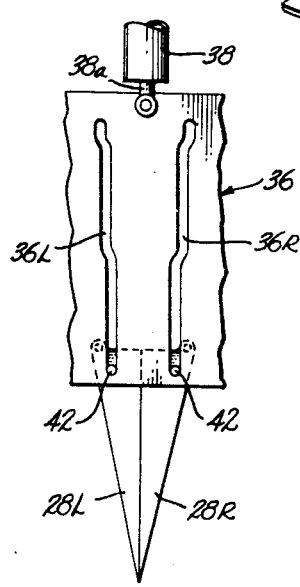

Figure 4 is a simplified side view showing means for actuating the movable sleeve and means actuating the control vanes by such actuation of the movable sleeve, the view showing a fragment of the sleeve and of the actuating means therefor and only one set of control vanes, it being understood that similar connections may be provided between the movable sleeve and each set of control vanes, the parts being shown in the full or normal-thrust setting of the nozzle means.

Figure 5:
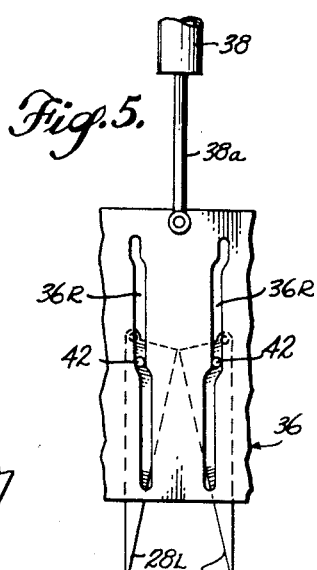

Figure 5 is a view similar to Figure 4 with the parts shown in the maximum noise suppression setting of the nozzle means.

Figure 6:
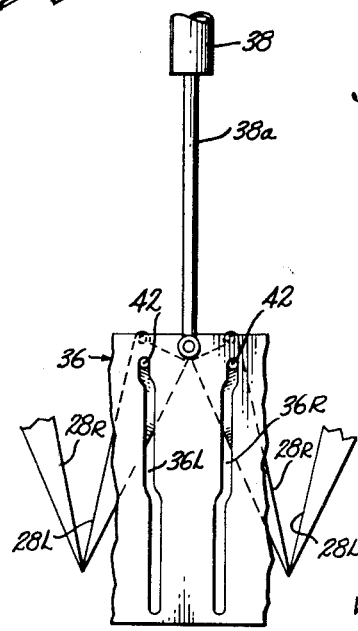

Figure 6 is a view similar to Figure 4 with the parts shown in the reverse-thrust settings of the nozzle means.

Figure 7:
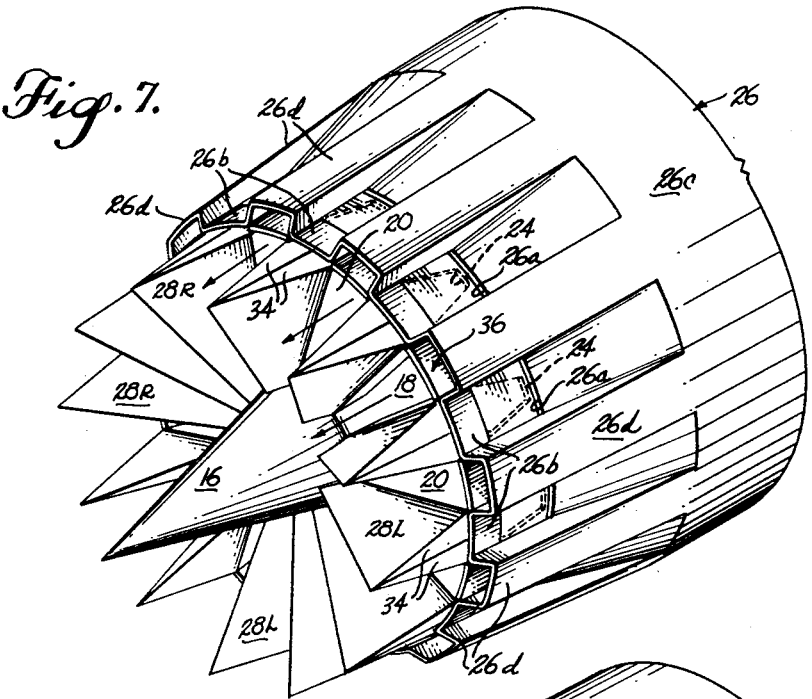

Figure 7 is a rear perspective view of the improved nozzle means in the full-thrust setting thereof, achieved as in Figure 4.

Figure 8:
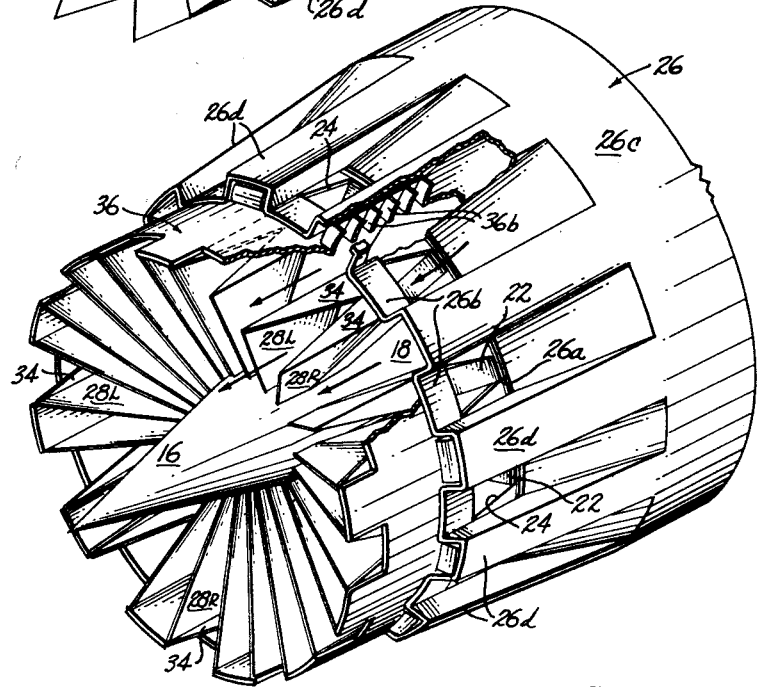

Figure 8 is a rear perspective view of the improved nozzle means in the maximum noise suppression setting thereof, achived as in Figure 5.

Figure 3:
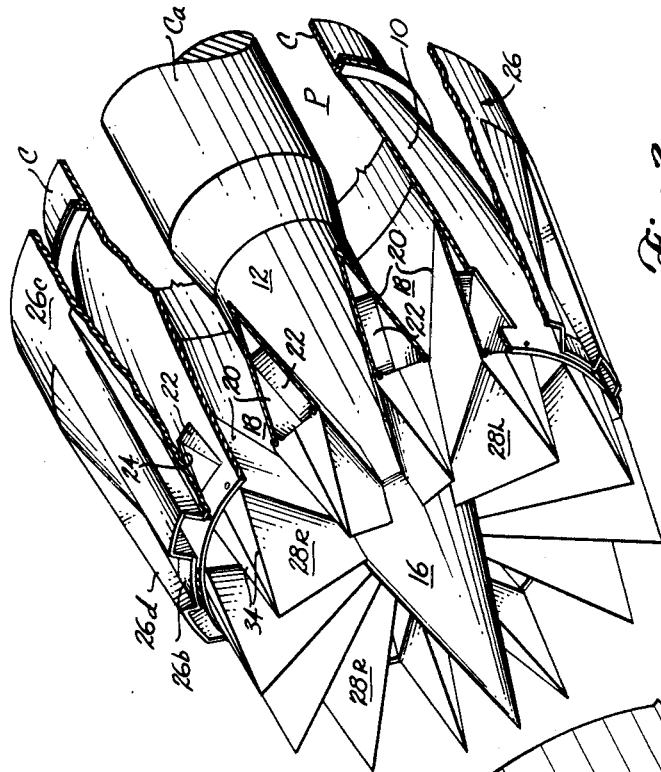
Figure 3 is a rear perspective view with parts broken away, showing the nozzle means without the inner sleeve.
Figure 2:
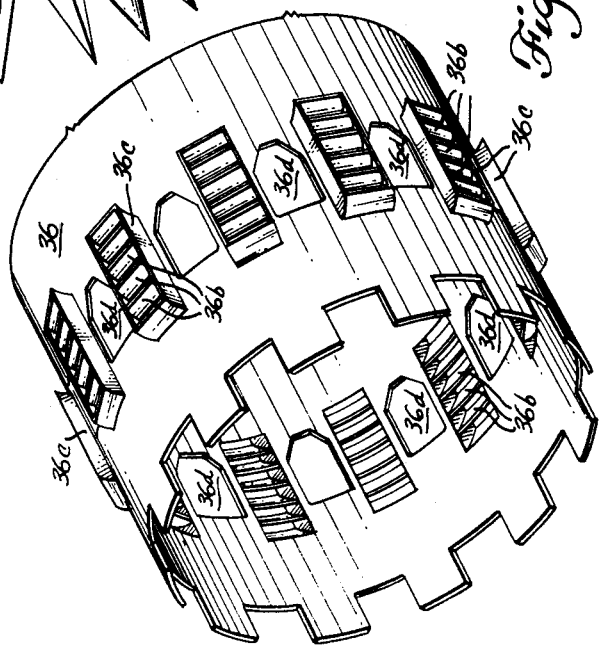
Figure 2 is a rear perspective view of the movable inner sleeve, omitting parts and connections for the support and actuation thereof.
Figure 9:
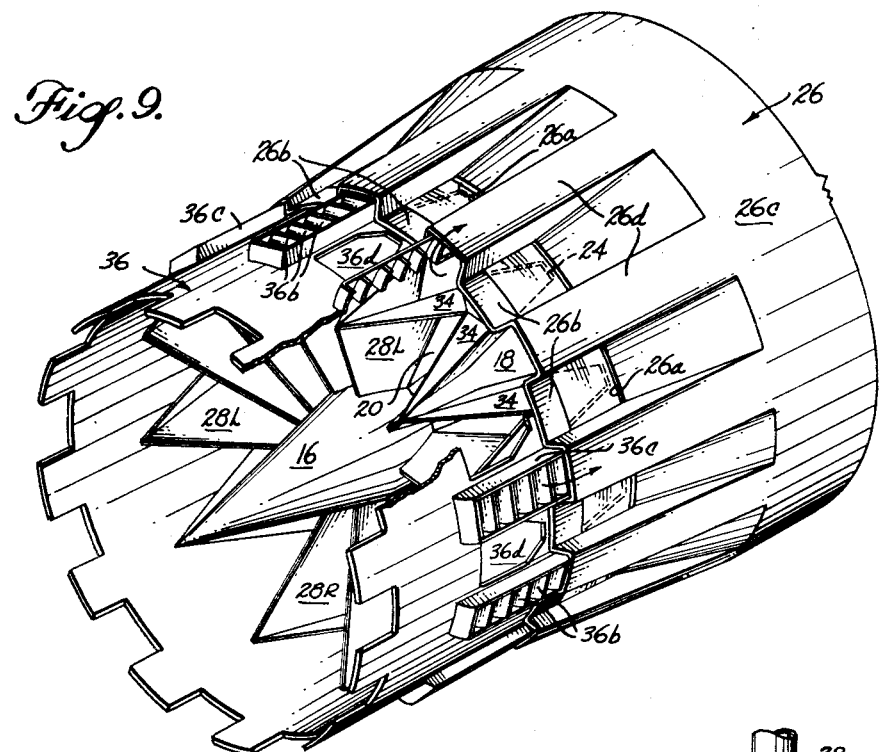

Figure 9 is a rear perspective view of the improved nozzle means in the reverse-thrust setting thereof, achieved as in Figure 6.

Figure 10 is a simplified schematic edge view of two pairs of control vanes and the flow dividers adjoining them, the view showing gas flow through the orifice space formed between the two pairs of vanes in the full-thrust position thereof.

Figure 11 is a similar view with the control vanes in the maximum noise suppression position thereof, the view also illustrating entrainment of secondary air between jet streams.

Figure 12 is a similar view with the control vanes in the reverse-thrust setting thereof, the view illustrating the action of the adjacent vanes of adjacent pairs cooperating to deflect gas flow outwardly into the deflectors to achieve reverse thrust.

Figure 13 is a side view of the parts as shown in Figure 12.

Referring to the drawings, the jet engine on which the illustrated nozzle means is mounted is not shown in its entirety but is represented by the outer and inner duct members C and Ca, respectively, which form the annular passageway P therebetween for rearward discharge of engine gases through the nozzle. The nozzle proper, as shown in the drawings, comprises the rearwardly divergent outer duct part 10 joined to the engine part C as a rearward continuation thereof, and the inner duct part 12 joined to the engine part Ca as a rearward continuation thereof to form the annular nozzle plenum chamber 14 (Figure 1). The inner duct part 12, of generally cylindrical form, is of somewhat smaller diameter than Ca and is joined thereto by a tapered portion 12a. A rearwardly tapered tail cone 16 is joined to the aft end of the cylindrical member 12 at the nozzle exit.

The annular plenum chamber or flow space 14 in the nozzle is divided into a plurality of orifice openings 18 by the forwardly tapered wedge-shaped stream dividers 20. Such flow dividers extend in diametral planes containing the nozzle axis A—A at regular interval spacings around the annular plenum chamber 14. The forward edges 20a of the flow dividers are inclined forwardly and outwardly in relation to the axis A—A (Figure 1) in order to minimize resistance to flow through the nozzle. Each such flow divider is formed by forwardly convergent metal plates and is thereby of hollow form. An inclined plate 22 extending transversely between the forwardly convergent plates within the flow divider forms a bottom wall of an air duct formed between the flow divider sides. Side openings 24 in the outer duct member 10 at the locations of the flow dividers permit flow of outside air into the hollow interiors of the flow dividers. The duct bottom plate 22 in each flow divider extends at an incline to axis A—A from the forward edge of the opening 24 to the base of the tail cone 16. Openings 26a in the outer cowl 26 lie in registry with the side openings 24 to permit air to be drawn into the duct spaces formed within the flow dividers when the control sleeve to be described is properly positioned for that purpose.

A plurality of pairs of control vanes 28L and 28R are mounted in the nozzle exit at the after ends of the respective flow dividers, the vane 28L being mounted on one side of the flow divider and the vane 28R being mounted on the opposite side of the flow divider with the forward edges of the respective vanes extending radially from the base of the tail cone 16. Each such vane is mounted extending generally radially and rearwardly between the inner and outer duct members 12 and 10 by pivotal supports 30 and 32 located at its forward edge to define a pivot axis for the vane which extends radially of the nozzle along the side of the associated flow divider. Triangular stiffener plates 34 are joined to the radially outer edges of the vanes in perpendicular relationship to the plane of each vane so as to close the outer end of the space which is formed between the vanes of each pair when the vanes are disposed in rearwardly convergent relationship, as shown in Figure 7, for example. The rearward edges of the individual vanes are not contained in a plane perpendicular to the axis A—A, i.e. are not parallel to the pivot axes of the respective vanes, but are disposed at a rearward and outward incline from the axis A—A for a reason to be explained.

The outer cowl 26 is of annular form, surrounding the nozzle proper with a slight separation between the reduced after end portion 26b of the cowl and the underlying after end portion of the duct member 10. The radial distance separating the two end portions as just described is sufficient to permit slidable passage therebetween of the control sleeve 36 axially of the nozzle. Side openings 36a formed in the control sleeve 36 at the circumferential locations of the gas ejection orifice spaces 18 are provided. The sleeve carries in registry with each such side opening 36 a set of curved gas deflector plates 36b with side supports 36c, forming curved flow spaces through which gases traveling generally radially through the side opening 36a are directed forwardly of the engine by reason of the curvature of the deflector plates 36b. The plates of each set are spaced apart along the length of the nozzle and are disposed generally parallel to each other approximately perpendicular to the nozzle axis A—A. The side openings 36a and registering set of curved deflector plates 36b are located at a position lengthwise of the sleeve such that they lie forwardly of the air inlets 24 in the duct member 10 with the sleeve 36 in its retracted position as shown in Figure 1.

Suitable means for moving the control sleeve 36 lengthwise of the nozzle may comprise the hydraulic jack 38 having a piston rod 38a coupled to the control sleeve 36. The outer cowl 26 having the reduced end portion 26b increases in diameter forwardly of the side openings 26a to a cylindrical shell 26c which forms a protective housing for the hydraulic jack 38 and any other mechanism for actuating the control sleeve 36, or otherwise. Guideways 26d for the sets of curved deflector plates 36b are formed in the outer cowl as inwardly and endwardly open longitudinally extending channels in the spaces between the side openings 26a, as shown. These guideways 26d or sheaves protect the curved deflector plates 36b in the retracted position of the control sleeve and prevent the plates from catching air and increasing the drag of the nozzle portion of the engine when the control sleeve is retracted and the engine is delivering forward drive thrust. The channel-like guideways 26d extend to the nozzle tip.

As shown in Figures 10, 11 and 12, the pairs of control vanes 28L and 28R have three significant positions between which they may be swung about their respective pivot axes 30—32. In Figure 10 the vanes are shown in their mutually rearwardly convergent positions wherein they form rearwardly divergent flow spaces 40 between adjacent pairs of vanes as rearward continuations of the orifice spaces 18 formed between adjacent flow dividers. This imparts to the nozzle a set of convergent-divergent type gas ejection orifices, which are highly efficient or conducive to development of maximum thrust by the engine. The presence of the tail cone 16 as a rearward continuation of the inner duct member 12 in such a nozzle also adds to the efficiency or thrust generation thereof. No secondary air is entrained between adjacent branch streams of the nozzle through the side openings 24 in this setting of the nozzle components and the nozzle efficiency is higher as a result of that factor also.

In Figure 11 the vanes are positioned with the members of each pair disposed substantially parallel so as to form gas flow spaces 40' with parallel sides. Also the separation of the rearward tips or edges of the vanes opens up the space between the vanes rearwardly and permits secondary air flowing through the openings 26a and 24 into the flow divider interiors to be entrained between adjacent branch streams flowing through the discharge openings 40'. The control sleeve 36 has a plurality of side openings 36b therein located circumferentially between the sets of curved deflector plates 36b, hence in circumferential registry with the side openings 24, 26a. With the vanes positioned as in Figure 11 and the control sleeve 36 positioned lengthwise of itself so that the side openings 36d are in longitudinal registry with the side openings 26a and 24, secondary air is drawn from the outside and passed through the spaces between pairs of vanes for such entrainment thereof. This constitutes the maximum noise suppression setting of the nozzle components in accordance with the teachings of the above-cited patent applications.

In Figure 12 the pairs of vanes occupy a third position in which the adjacent vanes of adjacent pairs are disposed in rearwardly convergent relationship in contact with each other along their inclined aft edges. In this setting of the vanes longitudinal flow of discharge gases from the orifice openings 18 is cut off in the rearward direction of flow and the gases are diverted radially outward, as shown in Figure 13. With the control sleeve 36 positioned longitudinally of itself so as to locate the sets of curved deflector plates 36b in longitudinal registery with the vanes, the outwardly directed gases enter the spaces between the deflector plates and are deflected forwardly of the engine. This is the reverse-thrust setting of the engine components. In this setting the body of the sleeve blocks flow of secondary air into the interiors of the flow dividers, as it does in the maximum-thrust setting shown in Figure 10.

While any of different means may be employed for moving the vanes in the desired manner between the positions illustrated, and of moving the control sleeve 36 longitudinally, as well as for coordinating the positioning of the control sleeve with the positioning of the vanes, an example of such a means is illustrated in Figures 4, 5 and 6. In these figures it will be seen that the control sleeve 36 which is longitudinally adjustable by the hydraulic jack 38 serves as the means for actuating the control vanes. The sleeve has a plurality of pairs of cam slots 36e and 36f therein which extend generally longitudinally of the engine, but which have jogs or discontinuities and progressively offset straight portions. Pins 42 mounted on the outer edges of the vanes 28R and 28L are received slidably in the slots, and as the sleeve is moved longitudinally by the jack 38 these pins cause the vanes to swing in or out as they traverse the jogs or discontinuities in the slots. In Figure 4 the pins 42 occupy extreme rearward positions in the slots 36L and 36R, associated with the respective vanes 28L and 28R of a pair. The distance separating the straight portions of slots 36L and 36R then occupied by the pins in this position of the sleeve is such that the vanes 28L and 28R are caused to occupy their mutually rearwardly convergent positions (Figures 7 and 10). As the sleeve is shifted rearwardly by the hydraulic jack 38 to the position shown in Figure 5, the pins reach and traverse the first jog in the cam slots and are more widely separated thereby. This swings the vanes apart to their mutually parallel positions corresponding to the diagram in Figure 11. In this position of the sleeve the side openings 36*d* in the sleeve are in registry with the side openings 24 in the nozzle duct member 10 and the nozzle is in its maximum noise suppression setting (Figures 8 and 11). As the control sleeve is advanced further to the rear the pins 42 reach and traverse the second step in each of the cam slots 36R and 36L, thereby further separating the control vanes of the associated pair and positioning such vanes as in Figures 9 and 12. In this reverse thrust position of the control parts the sets of curved deflector plates 36*b* lie in registry with the sets of vanes for intercepting the outwardly flowing gases and diverting such flow forwardly of the engine (Fig. 13).

In the operation of the improved nozzle means it will be recognized that in the maximum thrust setting thereof (Figures 7 and 10) some noise suppression is realized because of the division of the rearwardly flowing stream of gas into a plurality of radially disposed branch streams emerging from the nozzle through the orifice spaces 18. However, inasmuch as the convergent-divergent formation of the nozzle outlet spaces 40 permits the branch streams to recombine almost immediately upon leaving the nozzle substantial amounts of low-frequency noise are nevertheless generated. Secondary air flow is cut off in this setting of the nozzle, hence it cannot reduce nozzle efficiency. However, most of the low-frequency noise is eliminated by repositioning the vanes as shown in Figures 8 and 11, whereby the vanes of each pair extend in substantially parallel relationship. Under these conditions secondary air is drawn through the registered side openings in the nozzle cowl, control sleeve and duct member 14 for entrainment in the discharge stream of the engine in the spaces between branch streams issuing from the spaces 40'. Such secondary air flows through the hollow interiors of the flow dividers 20 and through the spaces formed between the vanes of the different pairs. The presence of the secondary air flow expedites mixing of the hot exhaust gases with the cooler air of the atmosphere in regions close to the nozzle so that any noise generated thereby occurs at relatively high frequencies. The presence of such secondary air flow between the branch streams also insures the maximum continued separation of such branch streams for some distance rearwardly of the nozzle so that recombining of the branch streams is deferred, and when it does take place the resulting turbulence is not so violent and the resulting low-frequency noise generation occurs at low intensity.

In the reverse-thrust setting of the nozzle, as shown in Figures 9 and 12, the rearwardly flowing gas streams are trapped between the adjacent vanes of adjacent pairs of vanes and because of the rearward and outward incline of the mutually contacting rear edges of such vanes, are deflected generally outwardly and into the spaces between curved deflector plates 36*b* mounted on the control sleeve 36. The plates 36*b* redirect the outwardly flowing gases into the forward direction, hence reverse the thrust of the engine. Inasmuch as the outwardly thence forwardly directed branch streams of gas are separated in the reverse-thrust setting of the engine nozzle as well as in the maximum noise suppression setting thereof (Figure 8), the engine operates relatively quietly in either setting.

In the above-cited Withington application reversal of thrust is achieved by vanes pivoted intermediate their front and rear edges and without requiring an auxiliary set of deflector plates or equivalent means. However, that case concerned primarily thrust reversal and noise suppression and was not specifically directed to the objective of convertability of the nozzle into one achieving maximum thrust at the expense of reduced suppression of noise.

I claim as my invention:

1. In a gas stream thrust reaction engine, noise suppression nozzle means comprising, in combination, inner and outer nozzle duct means forming an annular passage for discharge of engine gases rearwardly therefrom generally parallel to a central axis, a plurality of forwardly tapered stream divider elements mounted in said passage at the discharge end thereof, extending generally radially between said inner and outer duct means at spaced intervals therearound to divide the gas stream flowing through said passage into a plurality of rearwardly flowing circumferentially spaced branch streams, a plurality of pairs of vane elements, means supporting the vanes of such pairs in radially disposed positions disposed substantially in diametral planes parallel to said central axis and located at opposite sides of the respective stream dividers to permit pivoting of the vanes of each pair toward and from each other about their forward edges on generally radial pivot axes, and means operable to actuate said pairs of vanes for pivotal movement between rearwardly mutually convergent maximum thrust position, wherein the rearward edges of the vanes in each pair are disposed immediately adjacent each other, causing immediate convergence of gases passing such edges, and generally parallel-extending maximum noise suppression position dividing the gases issuing from said passage into a plurality of branched streams spaced apart by said vanes at the location of discharge, said vanes being located in said passage with their rear edges positioned at least substantially as far rearwardly as the discharge end of said outer nozzle duct means, whereby the spaces formed between branch streams emerging from between the pairs of parallel-extending vanes are open laterally to inflow of surrounding air.

2. In a gas stream thrust reaction engine, noise suppression nozzle means comprising, in combination, inner and outer nozzle duct means forming an annular passage for discharge of engine gases rearwardly therefrom generally parallel to a central axis, a plurality of forwardly tapered stream divider elements mounted in said passage at the discharge end thereof extending generally radially between said inner and outer duct means at spaced intervals therearound to divide the gas stream flowing through said passage into a plurality of rearwardly flowing radially disposed branch streams, a plurality of pairs of vane elements, means supporting the vanes of such pairs in radially disposed positions disposed substantially in diametral planes parallel to said central axis and located at opposite sides of the respective stream dividers to permit pivoting of the vanes of each pair toward and from each other about their forward edges on generally radial pivot axes, and means operable to actuate said pairs of vanes for pivotal movement between rearwardly mutually convergent maximum thrust position and generally parallel-extending maximum noise suppression position dividing the gases issuing from said passage into a plurality of branched streams spaced apart by said vanes at the location of discharge, said stream dividers having air-flow passages therein extending rearwardly for discharge of air into the spaces between the vanes of the respective pairs positionally associated therewith, and said outer duct means including a plurality of air inlets on the periphery thereof permitting flow of air into said air-flow passages for entrainment into the spaces between adjacent branch streams of gas with the vanes in maximum noise suppression position.

3. In a propulsion engine of the gas stream thrust reaction type having duct means with an exit of substantially regular form for discharge of gases as a column of substantially regular cross-sectional form rearwardly from the engine to create forward thrust therefrom, a plurality of stream divider members mounted in said exit at locations therein spaced apart successively across one dimension of said exit transversely to said discharge direction, with said divider members individually extending across another dimension of said exit transversely to said discharge direction, said stream divider members dividing the gaseous discharge passing through said exit into a plurality of rearwardly directed branch streams separated at said exit by substantially the thickness of said stream divider members, pairs of generally longitudinally extending vanes pivotally mounted at respectively opposite sides of said stream divider members at said exit for swinging of such vanes of each pair about transverse axes, spaced forwardly of their rear edges, toward and from each other and the vanes of respectively adjacent pairs, between relatively separated positional relationship of the vanes of each pair extending substantially in said direction of discharge to maintain said separation of said branch streams throughout the rearward extent of said vanes at least substantially to said exit, and mutually rearwardly convergent positional relationship providing immediate confluence passing said vanes, and means operable to move said pairs of vanes relatively between respective positions defined by said relationships, said vanes being located in said duct means with their rear edges positioned at least substantially as far rearwardly as the exit, whereby the spaces formed between branch streams emerging from between pairs of vanes are open laterally to inflow of surrounding air.

4. In a gas stream thrust reaction engine, noise suppression nozzle means comprising, in combination, duct means forming a passage for rearward discharge of engine gases, means in said duct means dividing such rearwardly discharging gases into a series of successively spaced separate branch streams, each of said dividing means having a pair of vane elements projecting rearwardly from respectively opposite sides thereof adjacent the branch streams on either side of such means, means supporting said vane elements forwardly of their rear edges to permit pivoting thereof about axes which extend generally perpendicular to the direction of gas flow and to the direction of series alignment of said dividing means, means to actuate said pairs of vane elements pivotally between rearwardly convergent and generally parallel positions, and means conducting outside air into the spaces between the vanes of each pair for entrainment thereof between the gas streams.

5. The engine defined in claim 4, wherein the dividing means comprises a plurality of forwardly tapered elements disposed in different diametral planes passing through a common central axis extending in the direction of discharge, thereby to divide the discharging gases into a circumferentially arranged series of branch streams.

6. A gas stream thrust reaction engine comprising duct means to discharge engine gases rearwardly in a plurality of successively spaced parallel streams, discharge orifice means thereon comprising sets of vane elements disposed on respectively opposite sides of the spaces between said streams and extending generally parallel thereto to pivot about the forward edges thereof, means to actuate said vane elements pivotally between mutually rearwardly convergent relationship and mutually substantially parallel relationship, and means directing flow of outside air into the spaces between the vane elements of the sets for entrainment of such air between the gas streams on opposite sides of such sets of vane elements with the vanes disposed substantially parallel.

7. In a gas stream thrust reaction engine, noise suppression nozzle means comprising, in combination, inner and outer nozzle duct means forming an annular passage for discharge of engine gases rearwardly therefrom generally parallel to a central axis, a plurality of forwardly tapered stream divider elements mounted in said passage extending generally radially between said inner and outer duct means at spaced intervals therearound rearwardly flowing radially disposed branch streams, a plurality of pairs of vane elements, means supporting the vanes of such pairs in radially disposed positions disposed substantially in diametral planes containing said central axis and located at opposite sides of the respective stream dividers to permit pivoting of the vanes of each pair toward and from each other about their forward edges on generally radial pivot axes, means operable to actuate said pairs of vanes for pivotal movement selectively from rearwardly mutually convergent maximum thrust position, to generally parallel-extending maximum noise suppression position, to rearwardly divergent thrust reversing position, and reversely, said vanes having rear edges inclined rearwardly outwardly from the central axis thereby to deflect the gas streams generally outwardly from said axis, a plurality of stream deflector means operable to intercept and deflect forwardly said respective outwardly deflected streams, movable means supporting said deflector means for movement thereof between retracted and operative positions of said stream deflector means, and means for actuating said movable support means to move said deflector means into operative position thereof upon actuation of said pairs of vanes into their rearwardly divergent position.

8. The engine defined in claim 7, wherein the support means comprises an elongated sleeve member disposed concentrically to the outer duct member and movable axially in relation thereto, said sleeve member having openings in the sides thereof at circumferentially spaced locations therearound corresponding to those of the spaces between stream dividers, and wherein the individual deflector means comprises a plurality of curved plates mounted in registry with the individual sleeve side openings.

9. The engine defined in claim 8, wherein the means for actuating the vanes comprises means interconnecting the sleeve and the vanes for moving such vanes by movement of the sleeve.

10. The engine defined in claim 8, wherein the stream dividers have air-flow passages therein extending rearwardly for discharge of air into the spaces between the vanes of the respective pairs positionally associated therewith, and wherein the outer duct means includes a plurality of air inlets on the sides thereof permitting flow of air into said air-flow passages for entrainment into the spaces between adjacent branch streams of gas with the vanes in maximum noise suppression position.

11. The engine defined in claim 7, wherein the stream dividers have air-flow passages therein extending rearwardly for discharge of air into the spaces between the vanes of the respective pairs positionally associated therewith, and wherein the outer duct means includes a plurality of air inlets on the sides thereof permitting flow of air into said air-flow passages for entrainment into the spaces between adjacent branch streams of gas with the vanes in maximum noise suppression position.

12. In a gas stream thrust reaction engine, noise suppression nozzle means comprising, in combination, duct means forming a passage for rearward discharge of engine gases, means in said duct means dividing such rearwardly discharging gases into a series of successively spaced separate branch streams, each of said dividing means having a pair of vane elements projecting rearwardly from respectively opposite sides thereof adjacent to the branch streams on either side of such means, means supporting said vane elements forwardly of their rear edges to permit pivoting thereof about axes which extend generally perpendicular to the direction of gas flow and to the direction of series alignment of said dividing means, means to actuate said pairs of vane elements pivotally selectively from rearwardly mutually convergent maximum thrust position, to generally parallel-extending maximum noise suppression position, to rearwardly divergent thrust reversing position, and reversely, said vanes having rear edges inclined rearwardly outwardly from the central axis thereby to deflect the gas streams generally outwardly from said axis, a plurality of stream deflector means operable to intercept and deflect forwardly said respective outwardly deflected streams, movable means supporting said deflector means for movement thereof between retracted and operative positions of said stream deflector means, and means for actuating said movable support means to move said deflector means into operative position thereof upon actuation of said pairs of vanes into their rearwardly divergent position.

13. The engine defined in claim 12, and means conducting outside air into the spaces between the vanes of each pair for entrainment thereof between the gas streams.

14. The engine defined in claim 13, wherein the dividing means comprises a plurality of forwardly tapered elements disposed in different diametral planes passing through a common central axis extending in the direction of discharge, thereby to divide the discharging gases into a circumferentially arranged series of branch streams.

15. A gas stream thrust reaction engine comprising duct means to discharge engine gases rearwardly in a plurality of successively spaced parallel streams, discharge orifice means thereon comprising sets of vane elements disposed on respectively opposite sides of the spaces between said streams and extending generally parallel thereto to pivot about the forward edges thereof, and means to actuate said vane elements pivotally selectively from rearwardly mutually convergent maximum thrust position, to generally parallel-extending maximum noise suppression position, to rearwardly divergent thrust reversing position, and reversely, and means including mutually adjacent vanes of adjacent sets of vanes for deflecting the gas streams laterally and forwardly of the engine with the vanes in their rearwardly divergent position.

16. The engine defined in claim 15, and means directing flow of outside air into the spaces between the vane elements of the sets for entrainment of such air between the gas streams on opposite sides of such sets of vane elements with the vanes disposed subtantially parallel.

17. In a propulsion engine of the gas stream thrust reaction type having duct means with an exit of substantially regular form for discharge of gases as a column of substantially regular cross-sectional form rearwardly from the engine to create forward thrust therefrom, a plurality of stream divider members mounted in said exit at locations therein spaced apart successively across one dimension of said exit transversely to said discharge direction, with said divider members individually extending across another dimension of said exit transversely to said discharge direction, said stream divider members being adapted to divide the gaseous discharge passing through said exit into a plurality of rearwardly directed branch streams separated at said exit by substantially the thickness of said stream divider members, pairs of generally longitudinally extending vanes pivotally mounted at respectively opposite sides of said stream divider members to permit swinging of such vanes of each pair about transverse axes, spaced forwardly of their rear edges, toward and from each other and the vanes of respectively adjacent pairs, between relatively separated positional relationship of the vanes of each pair extending substantially in said direction of discharge to maintain said separation of said branch streams throughout the rearward extent of said vanes, and mutually rearwardly convergent positional relationship to permit divergence and recombining of said branch streams in flowing rearwardly along said vanes, means conducting outside air into the spaces between the vanes of each of said pairs for rearward discharge from between such vanes in their separated positional relationship, and means operable to move said pairs of vanes relatively between respective positions defined by said relationships.

18. The propulsion engine defined in claim 17, and means operable to move the adjacent vanes of adjacent pairs toward each other into rearwardly convergent positional relationship, thereby to obstruct rearward flow of the branch streams and divert the gases laterally, and means laterally offset from said vanes, adapted to deflect said laterally diverted gases forwardly to produce reverse thrust from said engine.

19. The propulsion engine defined in claim 18, wherein the duct means are formed to define the exit as an annular opening, and wherein the pairs of vanes extend generally radially across said opening in circumferentially spaced relationship therearound, whereby the recombining of branch streams in the second-mentioned positional relationship of the pairs of vanes produces a column of gases of round cross-sectional form.

References Cited in the file of this patent

UNITED STATES PATENTS

| | | |
|---|---|---|
| 2,648,353 | Haworth | Aug. 11, 1953 |
| 2,664,700 | Benoit | Jan. 5, 1954 |

FOREIGN PATENTS

| | | |
|---|---|---|
| 995,748 | France | Aug. 22, 1951 |
| 1,035,814 | France | Apr. 22, 1953 |
| 580,995 | Great Britain | Sept. 26, 1946 |